Patented July 6, 1954

2,683,127

UNITED STATES PATENT OFFICE 2,683,127

COPOLYMERS OF A VINYL AROMATIC COMPOUND, AN ISOPROPENYL AROMATIC COMPOUND, AND A RUBBERY CONJUGATED DIENE POLYMER

Gerald A. Griess, Midland, Mich., assignor to The Dow Chemical Company, Midland, Mich., a corporation of Delaware No Drawing. Application May 2, 1952,
Serial No. 285,795

11 Claims. (Cl. 260—23.7)

This invention concerns certain modified vinyl aromatic resins having impact strengths and per cent elongation values greater than those of the corresponding unmodified vinyl aromatic resins. It also pertains to an improved method whereby modified vinyl aromatic resins having such desirable properties may be produced by a mass polymerization procedure more conveniently and satisfactorily than has heretofore been possible.

The modified vinyl aromatic resins provided by the invention consist essentially of interpolymers of a major amount of one or more monovinyl aromatic compounds of the benzene series with minor amounts of a monoisopropenyl aromatic compound and an unsaturated rubbery material such as natural rubber or a synthetic rubber derived from an aliphatic conjugated diolefine having from 4 to 6 carbon atoms in the molecule, e. g. butadiene, isoprene, or 2,3-dimethylbutadiene, etc. The interpolymers of styrene with minor amounts of alpha-methylstyrene and a rubbery copolymer of styrene and butadiene are of particular interest inasmuch as the polymerizable starting materials are readily available in large quantities. The modified resins are readily moldable by compression or injection molding techniques, possess a pleasing surface gloss, and have good mechanical properties, e. g. good tensile strength, impact strength and per cent elongation values. Because of their greater resistance to breakage under impact, the modified resins are in many instances preferred over the corresponding unmodified vinyl aromatic resins, i. e. the simple solid polymers of the vinyl aromatic compounds alone, in producing molded articles.

Ostromislensky, in U. S. Patent 1,613,673, has shown that by dissolving in styrene a minor amount of a gum, such as rubber or gutta percha, and polymerizing the solution a solid polymer may be obtained which is more flexible and less sensitive to shock than unmodified solid polystyrene. Although this known method for preparing modified polystyrene of improved shock resistance may readily be practiced on a laboratory scale with small quantities, e. g. 50 cc. or less, of the starting materials, it has been found difficult and unfeasible to control the mass polymerization of larger quantities, for instance one gallon batches or larger, of a solution of a natural or synthetic rubber in styrene alone as necessary in order to obtain polymeric products of satisfactory quality. It is well known that such polymerization reactions are highly exothermic and that the mixtures are poor conductors of heat, so that control of the temperature to obtain a satisfactory rate of polymerization without spontaneous overheating of the polymerization mixture is difficult and becomes more difficult with increase in the quantity of material being polymerized. Adequate temperature control during the mass polymerization of styrene alone has been a major problem of long standing. However, control of the mass polymerization of a solution of natural or synthetic rubber in styrene is far more difficult.

Such rubbers undergo gradual decomposition, or other chemical change, when heated together with styrene at temperatures in the order of 200° C. or above, and the degradation with impairment of the properties of the product becomes more pronounced with increase in the temperature or extension of the time of heating the mixture at such high temperatures. Also, the rubbery component apparently thickens the solution undergoing polymerization and thus renders it more difficult to withdraw heat from the solution than when polymerizing styrene alone. The degradation which takes place when a solution of styrene and a rubber is subjected to prolonged heating at 200° C. or above tends to cause discoloration and embrittlement of the polymer being formed. Such high temperatures may spontaneously be obtained over a period of many hours in the center of a body of the solution which is being heated in a bath at far lower temperatures, e. g. from 80° to 150° C. Although such temperature "runaways" may be avoided by carrying the polymerization out in an inert solvent medium, this necessitates extra and difficult steps of subsequently removing the solvent from the polymeric product and is undesirable from a manufacturing viewpoint.

It is an object of this invention to provide an improved method for the mass polymerization of monalkenyl aromatic compounds together with minor amounts of unsaturated rubbery materials which permits satisfactorily rapid accomplishment of the polymerization with control of the reaction temperature to obtain modified vinyl aromatic resins having the desirable properties hereinbefore stated. Another object is to provide new ternary interpolymers of a major amount of a monovinyl aromatic compound and minor amounts of a monoisopropenyl aromatic compound and an unsaturated natural or synthetic rubber, which interpolymers possess a greater luster or surface gloss than the previously known binary interpolymers of styrene and rubber, and have desirable mechanical properties, such as good tensile strength, impact strength, and per cent elongation values, similar to those of the corresponding binary copolymers of the vinyl aromatic compound and rubbery material. Other objects will be apparent from the following description of the invention.

I have found that isopropenyl benzene compounds, when admixed with a monovinyl aromatic compound and an unsaturated rubbery material, interpolymerize readily with the other materials and that such mixture may readily be polymerized en masse, i. e. in the absence of a liquid medium for the reactants, at a satisfactorily rapid rate, and without occurrence of a detrimental temperature runaway or degradation of the material under treatment, to obtain a modified vinyl aromatic resin of good appearance, good molding properties, and good strength and elongation values. The reasons why the temperature may be controlled more readily when polymerizing sizeable batches, e. g. one gallon lots or more, of the ternary mixture than when polymerizing similar batches of binary mixtures of the vinyl aromatic compound and a rubber, and why degradation occurs less extensively during polymerization of the ternary mixtures than during polymerization of the binary mixtures under similar conditions of time and temperature is not fully understood. It is believed that the isopropenyl aromatic component enters into the reaction to permit the polymerization to occur less vigorously but more uniformly at a given temperature between the three components of the ternary mixture than is possible at a similar temperature between the components of a binary mixture of the vinyl aromatic compound and a rubber, and consequentially that heat sufficient to cause degradation of the rubbery component of the binary mixture is, instead, utilized in furthering polymerization of the ternary mixture. It also appears that heat generated by the polymerization may escape, or be withdrawn, more readily from the ternary mixture than from the binary mixture. However, the invention is not limited to this explanation for the results obtained.

In practice, an unsaturated rubbery derivative of an aliphatic conjugated diolefine is dissolved in a liquid mixture of an ar-monovinyl aromatic compound of the benzene series and an ar-monoisopropenyl aromatic compound of the benzene series to form a solution containing from 50 to 96 per cent by weight of the monovinyl aromatic compound, from 2 to 40, preferably from 3 to 30, per cent of the monoisopropenyl aromatic compound, and from 2 to 10, preferably from 5 to 10, per cent of the rubbery material. Styrene is preferably used as the monovinyl aromatic starting material, but other compounds such as o-, m-, or p-methyl-styrene, ar-ethyl-vinylbenzene, ar-isopropylstyrene, or ar-chlorostyrene, or a mixture of two or more of such monovinyl aromatic compounds may be employed. Examples of suitable monoisopropenyl-benzene compounds are alpha-methylstyrene, ar-methyl-alpha-methylstyrenes, ar-ethyl-alpha-methylstyrenes, ar-isopropyl-alpha-methylstyrenes, and ar-chloro-alpha-methylstyrenes, or a mixture of two or more of such compounds. Among the rubbery derivatives of aliphatic conjugated diolefines which may be used are natural rubber, polymerized butadiene, polymerized isoprene, rubbery copolymers of styrene and butadiene, rubbery copolymers of styrene and isoprene, and rubbery copolymers of styrene, methyl isopropenyl ketone and butadiene, rubbery copolymers of acrylonitrile and butadiene, and mixtures of such rubbery materials. The solution preferably comprises styrene, alpha-methylstyrene and a rubbery copolymer of styrene and butadiene as its interpolymerizable components and may also contain a minor amount, e. g. from 0.5 to 5 per cent by weight, of other ingredients such as plasticizers, flow agents, lubricants, stabilizing agents, or polymerization catalysts, etc. provided such other ingredients are substantially inert, i. e. unreactive or only slightly reactive, in the polymerization reaction.

Thus, esters of saturated higher fatty acids, containing 16 or more carbon atoms in the acid radical, such as butyl palmitate, butyl stearate, amyl palmitate, amyl stearate, and hexyl stearate, etc., are unreactive and can be added in the minor proportions just mentioned as lubricants to facilitate the withdrawal from molds of articles molded from the interpolymers. Saturated esters, particularly alkyl stearates and more particularly n-butyl stearate, are preferred for such purpose. Esters of unconjugated drying oil fatty acids, e. g. linseed oil, soybean oil, and esters, such as the ethylene glycol or propylene glycol esters, of the fatty acids of linseed oil and soybean oil are unreactive, or reactive to only a slight and inconsequential extent when present in the above-stated minor proportions in the polymerization mixture, but are effective as flow agents for increasing the flow during molding of the heat-plastified interpolymer products. For instance, the tensile strength, impact strength, and per cent elongation values of such interpolymer product having 1 per cent by weight of butyl stearate and 1 per cent of soybean oil incorporated therewith are approximately the same regardless of whether the butyl stearate and soybean oil are added before or after the polymerization reaction for formation of the interpolymers, i. e. the extent to which such esters react, if at all, is too slight to have appreciable effect on the properties of the interpolymer. Also, after forming the interpolymer in admixture with 1 per cent by weight of butyl stearate and 1 per cent of soybean oil a major amount of the butyl stearate and of the soybean oil can be removed by extraction and be recovered as such. Because the aforementioned esters which may be employed as lubricants or flow agents are unreactive, or reactive to only a slight and inconsequential extent, they are hereinafter referred to as being inert.

It is important, however, that the polymerization mixture not contain unsaturated esters having highly reactive olefinic linkages in the molecule, e. g. a conjugated drying oil such as tung oil or a highly reactive poly-olefinic ester such as ethylene glycol dicrotonate, since such reactive esters enter into the interpolymerization reaction and decrease the impact strength of the interpolymer products.

An organic peroxide is usually employed as a polymerization catalyst in amount corresponding to from 0.01 to 1 per cent of the combined weight of the aforementioned starting materials, but a catalyst is not required.

The reaction mixture is preferably filtered to remove any undissolved rubbery material, or other solids, prior to being polymerized. Polymerization is accomplished by heating the mixture at temperatures between 50° and 100° C. until approximately half, e. g. from 40 to 60 per cent, of the alkenyl aromatic components of the mixture, are polymerized, and thereafter bringing the mixture to temperatures between 100° and 175° C., preferably from 140° to 160° C. As the reaction progresses and the mixture becomes thickened, withdrawal of heat generated by the reaction becomes more difficult until a major portion of the monomeric starting materials have been consumed. There is a tendency, usually when about half of the monomeric starting materials are consumed, for the mixture to undergo spontaneous heating with a sharp rise in the temperature, e. g. to above 200° C. Such spontaneous heating has not impaired seriously the quality of the polymer being formed when the temperature was prevented from rising above 230° C. and the temperature was above 175° C. for a time not greater than 10 hours, but more vigorous or prolonged overheating is detrimental and should be avoided. In practice, temperature rises above 175° C. are preferably prevented. The temperature is controlled in usual ways, e. g. by means of a surrounding bath of a temperature-control fluid such as oil or water, or by passage of such fluid through coils immersed in the reaction mixture, etc. Apparently, heat exchange occurs more readily between a temperature-control fluid and the ternary mixture of styrene, alpha-methylstyrene and the rubbery reactant than between the temperature-control fluid and a binary mixture of styrene and the rubbery reactant. Usually, from 5 to 10 days of heating is required in carrying out the polymerization reaction.

The polymeric product may be compression- or injection-molded to obtain translucent, accurately dimensioned articles. The molded articles are far more resistant to breakage when dropped, or struck sharply, than are similar moldings of unmodified polystyrene.

The following examples describe ways in which the invention has been practiced and illustrate certain of its advantages, but are not to be construed as limiting the invention.

EXAMPLE 1

In each of two comparative experiments, only one of which was in accordance with the invention, a solution of 5 per cent by weight of a rubbery copolymer (of approximately 4 parts of butadiene-1,3 and 1 part of styrene), 1 per cent of soybean oil and 1 per cent of n-butyl stearate in styrene or a mixture of styrene and alpha-methylstyrene was treated with 0.05 per cent of its weight of lauroyl peroxide. Approximately 90 pounds of the resultant solution was heated in a closed container immersed in a water bath. The successive temperatures at which the bath was maintained were 80° C. for 24 hours; 70° C. until the more vigorous part of the reaction had occurred and subsided as evidenced by heating of inner portions of the reaction mixture to temperatures above 130° C. followed by cooling of the mixture to approach the bath temperature; 85° C. for 24 hours and finally at 150° C. in an oven for 72 hours. The temperature inside the polymerization mixture was determined with an encased thermometer which projected into the mixture. The mixture was then removed from the polymerization vessel and a portion was molded into test pieces suitable for determining the properties of the product. The tensile strength, impact strength, and the per cent elongation values were determined in accordance with standard test methods. The polymer test pieces used in determining these properties were bars of square cross section and having the dimensions 2⅛ inches x ¼ inch x ¼ inch. Impact strength measurements were made both with notched and unnotched test bars of the dimensions just given, the notches of the notched bars being of 0.015 inch depth transversely across a side-face of the bar along a line midway between the ends of the bar. Table I gives the per cent by weight of styrene, and also of alpha-methylstyrene in the mixture of polymerizable materials used to prepare each product. The table gives the maximum, or peak, temperature to which the mixture spontaneously is heated due to the heat of reaction and the time, in hours, after the start of the polymerization when the peak temperature was reached. It also gives, for each polymeric product, the tensile strength in pounds per square inch; the impact strength in foot-pounds per sample both for notched and unnotched test bars; and the per cent of its original length by which a standard test bar could be stretched at room temperature before breaking.

*Table I*

| Run No. | In Starting Mixture | | Peak Temp. | | Properties of Product | | | |
|---|---|---|---|---|---|---|---|---|
| | Percent Styrene | Percent α-Methyl Styrene | ° C. | Hrs. When Reached | Tensile Strength lbs./sq. in. | Impact Strength | | Percent Elongation Value |
| | | | | | | Notched Bar, ft.-lbs. | Unnotched Bar, ft.-lbs. | |
| 1 | 93 | None | 274 | 27 | 1,430 | 0.015 | 0.048 | 0.98 |
| 2 | 88 | 5 | 144 | 84 | 4,230 | 0.22 | 0.79 | 10.4 |

EXAMPLE 2

Other portions of the respective interpolymers of Example 1 were mechanically worked for 10 minutes on a pair of 3-inch diameter compounding rolls internally heated at temperatures of 116° C. and 166° C., respectively. Each polymeric material was then molded into test pieces and its mechanical properties were determined as in Example 1. Table II identifies each interpolymer by stating whether it comprises chemically combined alpha-methylstyrene and gives the properties determined for the interpolymer.

*Table II*

| Run No. | Polymer Contains α-methyl-styrene | Properties | | | |
|---|---|---|---|---|---|
| | | Tensile Strength lbs./sq.in. | Impact Strength | | Percent Elongation Value |
| | | | Notched Bar ft.-lbs. | Unnotched Bar ft.-lbs. | |
| 1 | No | 3,508 | 0.028 | 0.096 | 1.6 |
| 2 | Yes | 5,010 | 0.27 | 1.25 | 33.2 |

EXAMPLE 3

In each of a series of experiments a solution, consisting of 93 parts by weight of a mixture of styrene and alpha-methylstyrene, 5 parts of a rubbery copolymer of styrene and butadiene similar to that employed in Example 1, one part of soybean oil, and one part of n-butyl stearate, was treated with the peroxide catalyst, or catalysts named in Table III in the proportions which are given. The mixture was then polymerized and the solid polymer was mechanically worked for about 10 minutes on a pair of 3-inch diameter compounding rolls internally heated to 116° C. and 166° C., respectively. The product was then molded into standard sized test pieces and its mechanical properties were determined. The procedure in carrying out each of these operations was as described in Examples 1 and 2. The experiments differed from one another either with regard to the relative proportions of styrene and alpha-methylstyrene employed, or with regard to the kind and proportion of organic peroxide used as a polymerization catalyst. Table III gives the per cent by weight of styrene and of alpha-methylstyrene in each mixture subjected to polymerization; names and gives the per cent by weight of the organic peroxide or peroxides initially added to each polymerization mixture; gives the maximum temperature attained by the mixture during the polymerization and the hours after the start of the polymerization when this peak temperature was reached; and gives the strength and per cent elongation values for the molded products.

For convenience, the interpolymer of styrene and the rubbery material is referred to as the "binary interpolymer" and the interpolymer of styrene, alpha-methylstyrene and the rubbery material is termed the "ternary interpolymer" in Table IV. The per cent of the visible light of various wave lengths directed onto the respective plates which was reflected is as follows:

*Table IV*

|  | Percent of light reflected at a wave length, in millimicrons of— ||||||||| 
|---|---|---|---|---|---|---|---|---|---|
|  | 420 | 440 | 460 | 480 | 500 | 520 | 540 | 560 | 580 |
| Binary Interpolymer | 63.0 | 65.5 | 68.5 | 70.5 | 71.5 | 71.8 | 72.0 | 72.0 | 72.3 |
| Ternary Interpolymer | 68.6 | 72.2 | 73 | 74.3 | 74.7 | 74.5 | 74.0 | 73.3 | 73.1 |

A truly white material gives the same per cent reflection values for visible light of all wave lengths, whereas colored materials give reflectance values which vary for different wave lengths of light. The above measurements show that the ternary interpolymer is more nearly white than the binary interpolymer. This was also apparent on visual inspection of the molded test plates, i. e. those of the ternary interpolymer appeared to be more nearly white than those of the binary interpolymer. Also, extruded sections of the ternary interpolymer possessed a greater gloss than those of the binary interpolymer.

EXAMPLE 5

A solution of 90 per cent by weight of styrene, 5 per cent of alpha-methylstyrene, and 5 per cent of a rubbery copolymer of about 3 parts by weight of butadiene-1,3, and 1 part of styrene, was treated with 0.03 per cent of its weight of benzoyl peroxide and heated in a bath which was maintained at 90° C. until the most vigorous part of the resulting polymerization reaction had occurred and

*Table III*

| Run No. | Starting Mixture Contains— || Added Catalyst || Peak Temp. || Properties of Product ||||
|---|---|---|---|---|---|---|---|---|---|---|
|  | Percent Styrene | Percent α-Methyl-styrene | Kind | Percent | °C. | Hrs. When Reached | Tensile Strength lbs./sq. in. | Impact Strength || Percent Elongation Value |
|  |  |  |  |  |  |  |  | Notched Bar ft.-lbs. | Un-notched Bar ft.-lbs. |  |
| 1 | 90.5 | 2.5 | Lauroyl Peroxide | 0.05 | 230 | 47 | 4,780 | 0.21 | 1.09 | 34 |
| 2 | 88 | 5 | ...do... | 0.05 | 144 | 84 | 5,010 | 0.27 | 1.25 | 33.2 |
| 3 | 83 | 10 | ...do... | 0.05 | 140 | 192 | 4,880 | 0.20 | 1.32 | 28.4 |
| 4 | 68 | 25 | ...do... | 0.05 | 218 | 44 | 5,380 | 0.23 | 0.99 | 15.6 |
| 5 | 88 | 5 | Benzoyl Peroxide | 0.03 | 150 | 210 | 5,480 | 0.31 | 1.35 | 43.6 |
| 6 | 88 | 5 | Lauroyl Peroxide and Benzoyl Peroxide | 0.025 / 0.025 | 96 | 160 | 5,550 | 0.27 | 1.79 | 38.8 |
| 7 | 88 | 5 | Lauroyl Peroxide and Benzoyl Peroxide | 0.03 / 0.02 | 104 | 170 | 5,700 | 0.31 | 0.90 | 32.4 |

EXAMPLE 4

An interpolymer of styrene with a rubbery copolymer of styrene and butadiene, and another interpolymer of styrene, alpha-methylstyrene and said rubbery styrene-butadiene copolymer, were prepared substantially as described in Example 1. The interpolymers were each compounded, on heated compounding rolls, with 2 per cent by weight of finely divided titanium dioxide, 0.015 per cent of ultramarine blue, and 0.2 per cent of a hydrocarbon wax. Each mixture was molded into test plates and the latter were tested for light reflectance by a standard test method using a recording spectrophotometer manufactured by the General Electric Company.

subsided. Thereafter, the mixture was heated at 150° C. for 3 days. The solid interpolymer, thus formed, was mechanically worked for 10 minutes on a pair of 3-inch diameter compounding rolls internally heated at temperatures of 116° and 166° C., respectively. It was then molded into a test bar having dimensions of ⅛ and x ½ inch x 2⅛ inches in length, which bar was notched to a depth of 0.015 inch transversely across its side edge of ⅛ inch thickness. The bar was employed in determining the impact strength of the product in accordance with conventional procedure, the bar being struck at its notched side of ⅛ inch thickness so as to be broken transversely across its width. Except for the dimensions of the test bar, the procedure in determining the impact strength was similar to that employed in Example 1. Other portions of the interpolymer were molded into test pieces which were used to determine the tensile strength and per cent elongation values of the interpolymer, as in Example 1. The interpolymer was found to have a tensile strength of 6450 pounds per square inch of cross section, an elongation value of 12.5 per cent, and an impact strength of 2 foot-pounds. It is estimated that the impact strength just given would correspond to a value of 0.6 foot-pound if determined using a notched bar of interpolymer having the dimensions of the test bars employed in Example 1.

This application is a continuation in part of my copending application, Serial No. 69,405, filed January 5, 1949, now abandoned.

In the claims the term "polymer" is used in its generic sense of pertaining to copolymers as well as homopolymers.

Other modes of applying the principle of the invention may be employed instead of those explained, change being made as regards the method or products herein disclosed, provided the steps or materials stated by any of the following claims, or the equivalent of such stated steps or materials be employed.

I therefore particularly point out and distinctly claim as my invention:

1. In a method of forming modified vinyl aromatic resins having higher impact strengths and higher per cent elongation values than the simple solid polymers of the corresponding vinyl aromatic compounds alone, the step of mass polymerizing a mixture of polymerizable compounds consisting of from 50 to 96 parts by weight of at least one monovinyl aromatic compound of the benzene series, which monovinyl aromatic compound is free of reactive substituents other than the vinyl radical and contains the vinyl radical as the only unsaturated aliphatic radical attached to a carbon atom of the benzene nucleus, from 2 to 40 parts of at least one monoisopropenyl aromatic compound of the benzene series, which monoisopropenyl aromatic compound is free of reactive substituents other than the isopropenyl radical and contains the isopropenyl radical as the only unsaturated aliphatic radical attached to a carbon atom of the benzene nucleus, and from 2 to 10 parts of at least one unsaturated rubbery polymer of an aliphatic conjugated diolefine.

2. In a method of forming modified vinyl aromatic resins having higher impact strengths and higher per cent elongation values than the simple solid polymers of the corresponding mono vinyl aromatic compounds alone, the steps of mass polymerizing a mixture of polymerizable compounds consisting of from 50 to 96 parts by weight of at least one monovinyl aromatic compound of the benzene series, which monovinyl aromatic compound is free of reactive substituents other than the vinyl radical and contains the vinyl radical as the only unsaturated aliphatic radical attached to a carbon atom of the benzene nucleus, from 2 to 40 parts of at least one isopropenyl aromatic compound of the benzene series, which monoisopropenyl aromatic compound is free of reactive substituents other than the isopropenyl radical and contains the isopropenyl radical as the only unsaturated aliphatic radical attached to a carbon atom of the benzene nucleus, and from 2 to 10 parts of at least one unsaturated rubbery polymery of an aliphatic conjugated diolefine, by heating the mixture, together with a catalytic amount of an organic peroxide, in closed vessel at temperatures between 50° and 100° C. until approximately half of the monomeric starting material is polymerized and thereafter bringing the mixture to temperatures between 100° and 230° C., while preventing the mixture from becoming heated to temperatures above 175° C. for more than 10 hours during the reaction.

3. A method, as described in claim 2, wherein the mono vinyl aromatic compound is styrene and the monoisopropenyl aromatic compound is alpha-methylstyrene and the polymerization mixture is maintained at temperatures between 50° and 170° C. throughout a major part of the reaction period.

4. A method, as described in claim 2, wherein the monovinyl aromatic compound is styrene, the monoisopropenyl aromatic compound is alpha-methylstyrene, the rubbery material is a rubbery copolymer of styrene and butadiene, the organic peroxide catalyst is lauroyl peroxide, and the polymerization mixture is maintained at temperatures between 50° and 170° C. throughout a major part of the reaction period.

5. A method, as described in claim 2, wherein the mixture subjected to polymerization comprises from 0.5 to 5 per cent by weight of at least one ester of a saturated aliphatic alcohol and an aliphatic monocarboxylic acid containing at least 16 carbon atoms in the acid radical and selected from the class consisting of saturated fatty acids and unconjugated drying oil fatty acids.

6. A method, as described in claim 2, wherein the polymeric product is mechanically worked at a heat plastifying temperature and is thereafter molded into finished articles.

7. A method, as described in claim 2, wherein the monovinyl aromatic compound is styrene, the monoisopropenyl aromatic compound is alpha-methylstyrene, the rubbery starting material is a rubbery copolymer of styrene and butadiene, the organic peroxide catalyst is lauroyl peroxide, the polymerization mixture is maintained at reaction temperature between 50° and 170° C. throughout a major part of the reaction period, and the polymeric product is mechanically worked at a heat plastifying temperature insufficient to cause thermal decomposition and is thereafter molded into finished articles.

8. A solid thermoplastic interpolymer of a polymerizable mixture consisting of from 50 to 96 parts by weight of at least one monovinyl aromatic compound of the benzene series, which monovinyl aromatic compound is free of reactive substituents other than the vinyl radical and contains the vinyl radical as the only unsaturated aliphatic radical attached to a carbon atom of the benzene nucleus, from 2 to 40 parts of at least one monoisopropenyl aromatic compound of the benzene series, which monoisopropenyl aromatic compound is free of reactive substituents other than the isopropenyl radical and contains the isopropenyl radical as the only unsaturated aliphatic radical attached to a carbon atom of the benzene nucleus, and from 2 to 10 parts of at least one unsaturated rubbery polymer of an aliphatic conjugated diolefine having from 4 to 6 carbon atoms in the molecule.

9. A solid thermoplastic interpolymer of a polymerizable mixture consisting of from 60 to 96 parts by weight of styrene, from 2 to 30 parts of alphamethylstyrene and from 2 to 10 parts of an unsaturated rubbery copolymer of styrene and butadiene-1,3.

10. A solid thermoplastic interpolymer as claimed in claim 8, having from 0.5 to 5 per cent of at least one ester, of a saturated aliphatic alcohol and an aliphatic monocarboxylic acid containing at least 16 carbon atoms and selected from the class consisting of saturated fatty acids and unconjugated drying oil fatty acids, intimately mixed together therewith.

11. A solid thermoplastic interpolymer, as claimed in claim 8, having about 1 per cent by weight of n-butyl stearate and about 1 per cent of soybean oil intimately mixed together therewith.

References Cited in the file of this patent

UNITED STATES PATENTS

| Number | Name | Date |
|---|---|---|
| 2,606,163 | Morris et al. | Aug. 5, 1952 |

FOREIGN PATENTS

| Number | Country | Date |
|---|---|---|
| 530,375 | Great Britain | Dec. 11, 1940 |